United States Patent [19]

Dysart

[11] 4,061,258
[45] Dec. 6, 1977

[54] MOUNTING STRUCTURE FOR A VEHICLE ACCESSORY SUCH AS A CB RADIO OR THE LIKE

[76] Inventor: Charles E. Dysart, 3401 Caldwell Drive, Raleigh, N.C. 27600

[21] Appl. No.: 689,746

[22] Filed: May 25, 1976

[51] Int. Cl.$^2$ .............................................. B60R 11/02
[52] U.S. Cl. ...................... 224/42.42 R; 224/42.45 R; 325/17
[58] Field of Search ................ 224/42.42 R, 42.45 R, 224/29 R, 42.11, 42.42 A, 42.45 B, 42.03 R; 248/226.2, 230, 74 R; 325/16, 111, 117

[56] References Cited

U.S. PATENT DOCUMENTS

| | | | |
|---|---|---|---|
| 2,743,075 | 4/1956 | Johnson | 224/42.45 R X |
| 3,315,798 | 4/1967 | Mathison | 224/42.42 R |
| 3,658,219 | 4/1972 | Van Ordt | 224/42.42 R |
| 3,964,612 | 6/1976 | Skilliter | 224/42.42 R X |

Primary Examiner—Robert J. Spar
Assistant Examiner—Jerold M. Forsberg
Attorney, Agent, or Firm—Mills & Coats

[57] ABSTRACT

The present invention relates to a mounting structure adapted to conform and be supported about the raised floor portion of a vehicle generally found about the front floorboard area of a motor vehicle generally centrally located between the sides of the vehicle. Such a raised floor portion of a vehicle is generally of an inverted U-shape and often overlies the vehicle transmission or a portion of the main drive train thereof. The mounting structure of the present invention comprises a generally arcuate shaped base support structure that is at least partially flexible and includes an adjustment screw for confining or tightening the base support structure about the raised floorboard portion of the vehicle in a tightly held fashion such that the mounting structure is supported in a firm and upright posture about the raised floorboard portion of the vehicle simply by a gripping action. Extending upwardly from said base support structure is an accessory support means that is adapted to receive and support a vertical shaft extending from a flat bracket that in turn supports the particular accessory such as a CB radio, AM-FM radio, tape or cassette player or the like. The interconnecting structure generally carried by the accessory may be readily received and held within the accessory support means such that the same may be held and supported thereby. But yet the accessory and associated attaching or connecting structure can be readily and quickly removed from said mounting structure when the vehicle is left unattended in order to prevent theft of the accessory.

6 Claims, 3 Drawing Figures

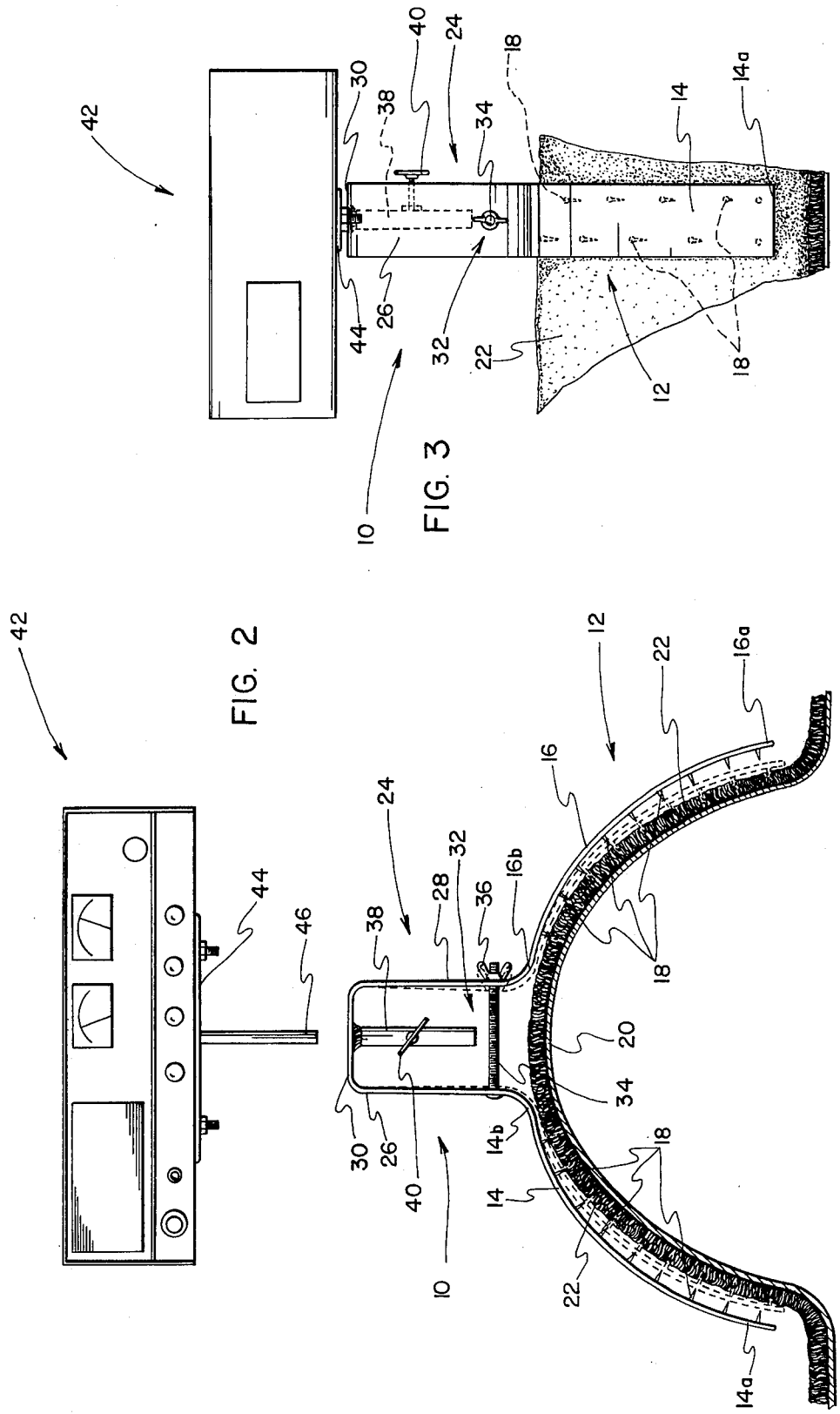

MOUNTING STRUCTURE FOR A VEHICLE ACCESSORY SUCH AS A CB RADIO OR THE LIKE

The present invention relates to a mounting structure, and more particularly to a vehicle floorboard mounting structure for supporting a vehicle accessory or option such as a CB radio, AM-FM radio, tape player or the like, wherein said mounting structure is particularly adapted to enable said accessory or option to be quickly disconnected or uncoupled from said mounting structure.

BACKGROUND OF THE INVENTION

Theft of radios and tape recorders and players from vehicles has long posed a problem to many vehicle owners. Such thefts continue to increase, and the problems has been even more pronounced and of more concern of late with the growing popularity of the CB radio among vehicle owners. The magnitude of the problem is illustrated by recent information suggesting that many insurance Companies that insure against theft from vehicles of such accessory are considering dropping such protection from their insurance policies.

One of the most practical and effective approaches to eliminating theft of such accessories or options from vehicles is to remove the particular accessory or option from its normal operating position within the vehicle when the same is left unattended. Once removed, the accessory or option may be locked in the vehicle trunk, or simply removed totally from the vehicle while the same is left unattended. To accommodate removal of such accessories, it is known to provide a mounting structure for the dashboard of a vehicle wherein a particular accessory such as a AM-FM radio or recorder can be readily mounted and dismounted from the mounting structure. In providing for such a mounting structure, it is important that such be readily adaptable to a particular vehicle involved, that the mounting structure enable the accessory to be quickly and conveniently mounted and dismounted without involving significant time and trouble, and also that the main mounting structure provide a strong and sturdy support for the accessory while in operation in the vehicle.

As stated above, such mounting structures have been provided for vehicle dashboards and generaly such allows an accessory such as a radio or tape player to be readily removed therefrom. But a close study of the design of such quick mount and dismount dashboard mounting structures reveals that in many instances the mounting structure itself has been difficult to mount to the vehicle's dashboard, and this particular problem is in some cases complicated further by the fact that the particular mounting structure is adapted to mount only to a limited member of dashboard designs. In addition, it has been found that many such mounting structures for radios, tape players or the like that provide for routine mounting and dismounting involve tedious and cumbersome work to remove the particular accessory from the mounting structure involved. Moreover, in certain cases, it is found that once the accessory is secured within the mounting structure it is in a place that is awkward or undesirable and difficult to reach to adjust the controls in accordance with the desired performance of the accessory.

SUMMARY OF THE INVENTION

The present invention presents a mounting structure adapted to be tightened around and secured about a raised floorboard portion of a vehicle wherein the mounting structure includes means for receiving and firmly holding an interconnecting attaching structure secured to and extending from an accessory such as a CB radio or the like. The mounting structure of the present invention includes a generally arcuate shaped base support structure that is particularly shaped to generally conform to the shape of a raised floorboard portion of a vehicle that generally overlies the vehicle transmission or a portion of the drive train thereof. The span or width between the generally arcuate shaped base can be varied by adjustment means provided with the mounting structure that enables the base structure to be placed over a raised floorboard portion within the vehicle after which the adjustment means is operative to generally close the outwardly extending arcuate shaped portions of the base which are provided with inwardly projecting spike means that engage and penetrate into carpet like material covering the raised floorboard portion. Thus, by closing the base support structure about the raised floorboard of the vehicle it is appreciated that the mounting structure of the present invention can be tightened to a degree where the same is firmly held in an upright position above the raised floorboard of the vehicle.

Extending upwardly from the base of the mounting structure is an accessory support means that extends a certain distance above the generally central area of the raised floorboard portion of the vehicle where the same is adapted to receive and firmly hold an interconnecting attaching structure extending from the particular accessory to be supported. Once placed in the accessory support means extending upwardly from the base structure of the mounting structure, the accessory can be readily and quickly removed from a stationary support position by appropriately actuating a release mechanism or structure associated with said accessory support means that allows the accessory and associated attaching structure to be removed therefrom. Consequently, it is seen that the mounting structure of the present invention enables one to provide for the normal stationary support of an accessory such as a CB radio or AM-FM radio or the like, while at the same time when the vehicle is to be left unattended the same accessory can be conveniently, quickly, and readily removed from the vehicle and stored in the trunk of the vehicle or taken completely from the vehicle to eliminate the possibility of the same being stolen from the vehicle during an unattended period.

It is, therefore, an object of the present invention to provide a mounting structure adapted to be mounted interiorly of a vehicle and to normally support an accessory such as a CB or AM-FM radio or the like therein, wherein said mounting structure is provided with means for allowing said accessory to be quickly and easily mounted to the mounting structure and also to be quickly and easily dismounted from the same, thereby permitting the accessory to be conveniently removed from the vehicle when left unattended.

A further object of the present invention is to provide a quick accessory detachable mounting structure for a vehicle wherein the mounting structure itself adapts easily and conveniently to various makes and models of vehicles.

Another object of the present invention is to provide a quick accessory detachable mounting structure for a vehicle of a relatively simple and inexpensive design that may be installed in a vehicle with a minimum of effort.

Still a further object of the present invention resides in the provision of a quick accessory detachable mounting structure for a vehicle wherein said mounting structure is designed to support said accessory in an easily accessible and desirable position.

A more particular object of the present invention is to provide a vehicle floorboard supported mounting structure of the type described above wherein said mounting structure is supported above a raised or elevated portion of the floor about the front seat area of the vehicle generally midway between the side extremities of the vehicle.

Another object of the present invention is to provide a vehicle floorboard support mounting structure that is adapted to be secured about a raised or elevated portion of the floorboard by an adjustment mechanism that generally closes a base support portion of the mounting structure about the raised or elevated portion of the floorboard so as to tighten the same thereagainst whereby the mounting structure is securely held.

Other objects and advantages of the present invention will become apparent from a study of the following description and the accompanying drawings which are merely illustrative of the present invention.

BRIEF DESCRIPTION OF THE DRAWINGS

FIG. 1 is a perspective view of the mounting structure of the present invention disposed about a raised or elevated vehicle floorboard portion wherein the mounting structure is supporting an accessory such as a CB or AM-FM radio or the like.

FIG. 2 is a front elevational view of the mounting structure of the present invention disposed about a raised or elevated floorboard portion of a vehicle shown in section, wherein the base support structure of the mounting structure is shown in full lines in an open position, and in dotted lines in a closed tightly held position about the raised or elevated vehicle floorboard portion of the vehicle.

FIG. 3 is a side elevational view of the mounting structure of the present invention having the accessory mounted thereon and supported thereby, with the mounting structure being transversely disposed about the raised or elevated floorboard portion of a particular vehicle.

DESCRIPTION OF PREFERRED EMBODIMENT

Figure 1:
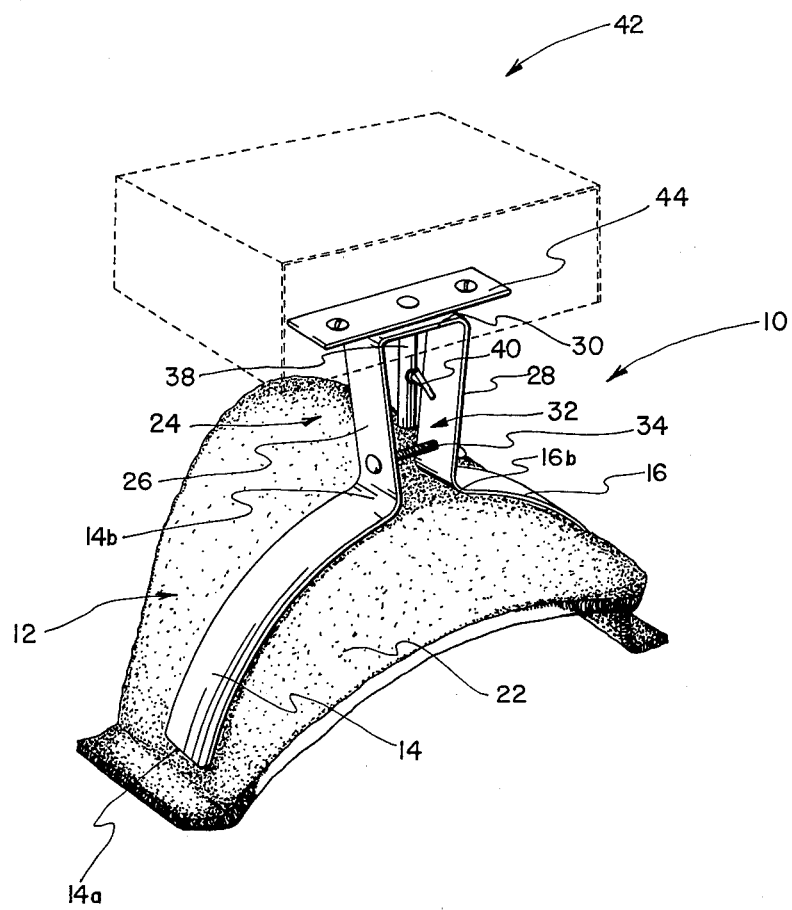

With further reference to the drawings, particularly FIG. 1, the accessory mounting structure of the present invention is shown therein and indicated generally by the numeral 10. In the preferred embodiment shown herein, mounting structure 10 is particularly adapted to extend over and to be secured to the raised or elevated floorboard portion of a vehicle that generally lies in the vicinity of the front seat area generally midway between the side extremities of the particular vehicle. Such a raised or elevated floorboard portion generally overlies the vehicle transmission or a portion of the power train thereof and is very common in various makes and models of both domestic and foreign automobiles being produced today.

Now with reference to the detailed structure of the mounting structure 10, it is seen that the same includes a base support structure indicated generally by the numeral 12 that extends in a generally arcuate fashion when secured within the vehicle over the raised or elevated floorboard portion of the vehicle. Base support structure 12 includes a pair of arcuate shaped segments 14 and 16, each segment being disposed about respective sides of the mounting structure 10 and extending in a generally arcuate fashion from a lowerouter portion point (14a or 16a) to an inner upper area indicated by the numerals 14b and 16b. Fixed to the respective arcuate shaped segments 14 and 16 are a series of spaced apart spikes or cleats 18 that extend inwardly from the inner sides of the respective segments 14 and 16 where the spikes, when the mounting structure is supported about the raised or elevated floorboard portion, engage and penetrate through carpet or floor covering material 22 that generally overlies the floorboard of the vehicle referred to by numeral 20.

Extending upwardly above the generally central area of said raised or elevated vehicle floorboard portion is an accessory support means indicated generally by the numeral 24. Viewing accessory support means 24 in detail, it is seen that the same includes sides 26 and 28 that extend generally upwardly from the upper inner portions 14b and 16b of the respective arcuate shaped base support segments 14 and 16. Extending transversely across sides 26 and 28 of accessory support means 24 is a transverse member 30 that includes a receiving sleeve 38 that is hollow and generally disposed vertically between sides 26 and 28. Threadedly secured within receiving sleeve 38 is a tightening screw or holding member 40 that is adapted to be screwed inwardly and outwardly generally perpendicular to the longitudinal axis of the receiving sleeve 38.

Extending transversely between sides 26 and 28 of accessory support means 24, just below the lower terminal end of the receiving sleeve 38, as viewed in FIG. 2, is an adjustment means, indicated generally by the numeral 32, that is adapted to vary the span or general distance extending between certain portions of the arcuate shaped base support segments 14 and 16. Viewing the adjustment means 32 in more detail, it is seen that the same includes a transverse screw 34 that extends through appropriate openings formed within sides 26 and 28, and wherein screw 34 is provided with a wing nut 36 opposite the head thereof.

The mounting structure 10 of the present invention is particularly adapted to support what is referred to herein as an accessory, indicated generally by the numeral 42, such an accessory being a CB radio, AM-FM radio, tape or cassette recorder and/or player, or the like. It will be appreciated by those skilled in the art that any such accessory could be adapted to be utilized and supported by the support structure 10 of the present invention. In the case of the present disclosure, to illustrate this, the accessory 42 is in the form of a CB radio in which the CB radio is provided with an interconnecting attaching means that is adapted to be compatible with the mounting structure 10 of the present invention just described. Referring now to the interconnecting attaching means, it is seen that a horizontal bar or plate 44 is secured directly to the accessory 42 or to a plate disposed thereunder that in turn supports the accessory. Secured to the horizontal bar or plate 44 and depending generally downwardly therefrom is a securing shaft 46 that is adapted to be received within receiving sleeve 38 of the mounting structure 10.

It will be appreciated that the accessory 42 can be mounted to the mounting structure 10 by simply placing the shaft 46 within the receiving sleeve 38 where the accessory 42 is supported about the accessory support means 24. To firmly hold the accessory 42 about the mounting structure 10, the tightening screw or holding member 40 is tightened against the shaft 46 to stabilize the same and to generally prevent the shaft 46 from rotating within the receiving sleeve 38. Therefore, it is appreciated that the accessory 42 can be supported in a very stable position above the mounting structure 10 for normal operation within the vehicle.

One principal feature of the mounting structure 10 of the present invention is that the accessory 10 can be readily and conveniently removed from the mounting structure when the vehicle is left unattended. This is simply accomplished by appropriately unloosening the tightening screw or holding member 40 from the receiving sleeve 38, after which the accessory 42 can be pulled without any resistance or obstruction from the mounting structure 10.

As shown in the drawings, it is seen that the basic structure of the mounting structure 10 can be bent and constructed of a single piece of a suitable type of material such as a light to medium weight of metal or steel. In the case of the embodiment shown, it is appreciated that the structure 10 is particularly adapted to fit around a raised or elevated vehicle floorboard. To give the mounting structure 10 this capacity, it is seen that with the form of construction shown in the drawings that it is desirable for the basic structure thereof to be at least partially flexible in order that the span or distance between respective portions of the arcuate shaped base segments 14 and 16 can be adjusted by tightening the wing nut 36 that is threadedly disposed about one end of adjusting screw 34. With respect to FIG. 2, it is seen that before placing the mounting structure over the raised vehicle floorboard ridge 20, that the adjusting means 32 is so positioned that the span or area between the arcuate base segments 14 and 16 is such that the structure can be placed directly over the vehicle floorboard ridge. Afterwards by tightening nut 36 the segments 14 and 16 can be closed to fit tightly about the floorboard 20.

Although the basic structure of the mounting structure 10 is shown to be one continuous member particularly shaped to give rise to the arcuate shaped segments 14 and 16, the sides 26 and 28 of the accessory support means, and the transverse top member 30 thereof, it will be appreciated by those skilled in the art that this same basic structure could be provided for by as many as two or more sub-assemblies bolted or secured together by other appropriate means. In addition, although it has been mentioned hereinbefore that the construction material of the preferred embodiment would be preferably some form of metal or steel, it will be appreciated by those skilled in the art that the advantages of the mounting structure 10 of the present invention could also be gained by using other such materials such as a plastic or the like.

From the foregoing specification, it is seen that the mounting structure 10 of the present invention is particularly designed to be readily adaptable to the interior raised floorboard portion of a vehicle, and is generally lightweight in the construction and would be inexpensive to manufacture but yet sturdy and strong in order to give sufficient support to an appropriate accessory 42. Of prime importance is the fact that the mounting structure 10 of the present invention enables the accessory 42 to be quickly and conveniently mounted and dismounted from the mounting structure 10. This is particularly important in view of the current problem relating to theft of such accessories from vehicles left unattended. To eliminate such theft, one can readily dismount the accessory 42 from the mounting structure 10 in accordance with the procedure already discussed herein, and the accessory 42 can be removed from the mounting structure 10 and placed in the vehicle's trunk or even completely removed from the vehicle all together.

The terms "upper", "lower", "forward", "rearward", etc., have been used herein merely for the convenience of the foregoing specification and in the appended claims to describe the mounting structure for a vehicle accessory such as a CB radio or the like and its parts as oriented in the drawings. It is to be understood, however, that these terms are in no way limiting to the invention since the mounting structure for a vehicle accessory such as a CB radio or the like may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A support assembly for receiving and supporting an accessory such as a CB radio, AM-FM radio, tape or cassette recorder, or the like, wherein said support assembly is adapted to extend over a raised floor portion of a vehicle and to support said accessory such that the same may be readily detached from said support assembly, said support assembly comprising: a base support structure for extending over said raised floor portion of said vehicle and adapted to be securely clamped thereto, said base support structure comprising first and second base side members having outer end portions that terminate generally about respective lower side portions of said raised floor portion and inner ends that terminate in spaced apart relationship about a generally central portion of said floor portion, said first and second base side members including means for positively engaging said raised floor portion when said base support structure is placed over said raised floor portion; accessory support means integrally formed with said base and extending generally upwardly from said base support structure for supporting a particular accessory above said raised floor portion, said accessory support means including a pair of laterally spaced apart upstanding side support members extending generally upwardly from respective inner end portions of said first and second base side members and cross member means extending between said side support members and generally above said space defined between the inner ends of said base side members; said accessory support means including releasable securing means for receiving and holding interconnecting attaching means extending from said particular accessory whereby said accessory may be readily and quickly attached and detached from said support assembly wherein a vehicle operator may protect against theft of the particular accessory by detaching and removing the accessory from said support assembly when leaving the vehicle unattended; and adjustment means transversely extending between said pair of laterally spaced apart support members of said accessory support means for adjusting the span between said first and second base side members such that by actuating said adjustment means said first and second base side members can be opened and closed about said raised floor portion such that when in a closed position said first and second base support members engage said raised floor portion and are firmly held thereabout by said positive engaging means associated therewith.

2. The support assembly of claim 1 wherein said releasable securing means includes a vertically disposed hollow tubular member supported by said cross member means generally between said laterally spaced side support members of said accessory support means and wherein said generally hollow tubular member is provided with a screw type adjustment means that is threadly supported within a side wall portion thereof and adapted to be adjustably screwed against a shaft forming a part of said interconnecting support means extending from said particular accessory, whereby the accessory can be readily attached and detached from said support assembly by positioning said shaft of said interconnecting support means into said generally hollow tubular member forming a part of said accessory support means.

3. The support assembly of claim 2 wherein each of said first and second generally arcuate shaped side support members of said base support structure includes a series of spaced apart cleat means fixed to the inner sides thereof and projecting inwardly therefrom where said cleat means engages and penetrates into carpet like material covering said raised floor portion of said vehicle so as to positively hold said support assembly about said raised floor portion.

4. A support assembly for receiving and supporting an accessory such as a CB radio, AM-FM radio, tape or cassette recorder, or the like, wherein said support assembly is adapted to extend over a raised floor portion of a vehicle and to support said accessory such that the same may be readily detached from said support assembly, said support assembly comprising: a base support structure for extending over said raised floor portion of said vehicle and adapted to be securely clamped thereto, said base support structure including first and second base side members that normally extend over a substantial portion of said raised floor portion, said first and second base side members having outer end portions that terminate generally about respective lower side portions of said raised floor portion and inner ends that terminate in spaced apart relationship about a generally central portion of said raised floor portion; said base side members having means associated therewith for positively engaging said raised floor portion such that when properly disposed over said raised floor portion said first and second base side members may be firmly held thereabout; accessory support means integrally formed with said base and extending generally upwardly from said base support structure for supporting a particular accessory above said raised floor portion and including a pair of laterally spaced apart upstanding side support members that extend generally upwardly from respective inner end portions of said first and second base side members, and cross member means extending between said side support members generally above said space defined between the inner ends of said base side members; adjustment means extending transversely between said pair of laterally spaced apart side support members of said accessory support means for adjusting the area between said first and second base side members such that by actuating said adjustment means said first and second base side members can be opened and closed about said raised floor portion wherein when closed about said raised floor portion the support assembly is firmly held by the positive engaging means associated with said first and second base side members; releasable securing means normally supported by said accessory support means and normally operatively connected to said particular accessory such that said accessory may be readily and quickly attached and detached from said support assembly; and wherein said releasable securing means includes an elongated securing shaft normally extending from said particular attachment and held in a receiving sleeve vertically oriented and supported by said accessory support means, and wherein said receiving sleeve is provided with means for securely holding said receiving shaft firmly in said receiving sleeve.

5. The support assembly of claim 4 wherein said first and second side base members of said base support structure, and said pair of laterally spaced apart side support members and cross member means of said accessory support means are all integrally constructed and form a continuous uninterrupted single piece construction member; and wherein said first and second base support members are generally arcuate shaped and wherein said positive engaging means associated therewith comprise a series of cleats fixed to the inner sides of said base support members and project inwardly therefrom for engagement with said raised floor portion; and wherein said adjustment means includes a transverse screw adjustment means that extends between said pair of laterally spaced side support members of said accessory support means such that by adjusting the screw adjustment means extending between said side support members of said accessory support means such that as said screw adjustment means is adjusted said base side members may move back and forth because of the continuous uninterrupted construction existing between said base support structure and said accessory support means.

6. The support assembly of claim 5 wherein there is provided an accessory support plate that is normally secured to the particular accessory and is also secured to the elongated securing shaft; and wherein said receiving sleeve is fixed to said cross member means of said accessory support means and extends downwardly therefrom generally between said side support members of said accessory support means such that said accessory may be supported in a firm and stable posture above said accessory support means.

* * * * *